(12) United States Patent
Harvey et al.

(10) Patent No.: US 10,119,292 B1
(45) Date of Patent: Nov. 6, 2018

(54) DEPLOYABLE BOOM AND DEPLOYABLE BOOM WITH SOLAR BLANKET

(71) Applicant: MMA Design, LLC, Boulder, CO (US)

(72) Inventors: Thomas J. Harvey, Nederland, CO (US); Colleen R. Harvey, Nederland, CO (US); Timothy J. Ring, Lafayette, CO (US)

(73) Assignee: M.M.A. Design, LLC, Louisville, CO (US)

( * ) Notice: Subject to any disclaimer, the term of this patent is extended or adjusted under 35 U.S.C. 154(b) by 153 days.

(21) Appl. No.: 15/201,252

(22) Filed: Jul. 1, 2016

Related U.S. Application Data

(60) Provisional application No. 62/188,373, filed on Jul. 2, 2015.

(51) Int. Cl.
*E04H 12/18* (2006.01)
*E04H 12/34* (2006.01)
*E04C 3/00* (2006.01)
*H02S 30/20* (2014.01)

(52) U.S. Cl.
CPC .......... *E04H 12/185* (2013.01); *E04C 3/005* (2013.01); *E04H 12/34* (2013.01); *H02S 30/20* (2014.12)

(58) Field of Classification Search
CPC .......... B64G 1/44; B64G 1/443; B64G 1/446; B64G 1/222; E04H 12/02; E04H 12/185; E04H 12/34; E04C 3/005; B65H 75/4402; B65H 2701/371; B65H 75/364; H02S 30/20
USPC ............. 52/63, 408, 645, 646, 648.1, 650.3, 52/651.01, 651.06, 653.1, 108; 244/159.5, 172.6, 172.7, FOR. 112; 74/490.04, 490.01, 490.03, 89.2, 89.21, 74/89.22; 242/379.2, 379.5, 400, 390.2, 242/594, 594.1, 595, 595.1, 594.2; 136/244, 245, 292; 248/579, 580, 591, 248/602

See application file for complete search history.

(56) References Cited

U.S. PATENT DOCUMENTS

| | | | |
|---|---|---|---|
| 2,130,993 A | 9/1938 | Dubilier | |
| 3,016,988 A | 1/1962 | Browning | |
| 3,371,801 A * | 3/1968 | Widegren | B66C 23/64 182/41 |
| 3,486,279 A | 12/1969 | Webb | |
| 3,699,585 A | 10/1972 | Morrison | |
| 4,151,872 A | 5/1979 | Slysh et al. | |
| 4,265,690 A * | 5/1981 | Lowenhar | H01P 3/00 156/148 |

(Continued)

*Primary Examiner* — Theodore V Adamos
(74) *Attorney, Agent, or Firm* — Christopher J. Kulish

(57) ABSTRACT

A deployable boom structure is provided that, in one embodiment, includes one or more perforated tapes, a drive mechanism with a sprocket mechanism for engaging each of the perforated tapes to transition the tapes between an undeployed state and a deployed state, and three battens that each extend between the tapes. At least one of the battens is a sliding batten, i.e., a batten that engages each of the tapes but through which each of the tapes can slide. Lanyards and detents cooperate to fix the location of a sliding batten relative to the tapes after a predetermined length of each of the tapes has slid through the batten. In a particular embodiment, the deployable boom structure is coupled with a solar blanket that can be Z-folded.

22 Claims, 20 Drawing Sheets

(56) References Cited

U.S. PATENT DOCUMENTS

| | | | | |
|---|---|---|---|---|
| 4,725,025 A * | 2/1988 | Binge | ...................... | B64G 9/00 |
| | | | | 136/245 |
| 4,866,892 A | 9/1989 | Satoh et al. | | |
| 4,866,893 A | 9/1989 | McGinnis | | |
| 5,056,278 A * | 10/1991 | Atsukawa | ............. | E04H 12/185 |
| | | | | 248/161 |
| 5,069,948 A * | 12/1991 | Fromson | ................ | E04B 1/344 |
| | | | | 428/12 |
| 5,085,018 A * | 2/1992 | Kitamura | ............. | H01Q 1/1235 |
| | | | | 52/108 |
| 5,228,644 A * | 7/1993 | Garriott | ................ | B64G 1/443 |
| | | | | 136/245 |
| 5,351,062 A * | 9/1994 | Knapp | .................... | H01Q 1/08 |
| | | | | 248/436 |
| 6,571,914 B2 | 6/2003 | Lee et al. | | |
| 6,904,722 B2 | 6/2005 | Brown et al. | | |
| 6,970,143 B2 * | 11/2005 | Allen | ..................... | H01Q 15/20 |
| | | | | 343/880 |
| 7,617,639 B1 * | 11/2009 | Pollard | .................. | B64G 1/222 |
| | | | | 343/915 |
| 7,694,465 B2 | 4/2010 | Pryor | | |
| 8,042,305 B2 | 10/2011 | Pryor et al. | | |
| 8,490,511 B2 * | 7/2013 | Saito | ....................... | B25J 9/104 |
| | | | | 52/108 |
| 9,764,857 B2 * | 9/2017 | Baudasse | ............... | B64G 1/222 |
| 2002/0112417 A1 * | 8/2002 | Brown | .................. | B64G 1/222 |
| | | | | 52/108 |
| 2003/0057329 A1 * | 3/2003 | Thompson | ............. | B64G 1/443 |
| | | | | 244/172.7 |
| 2008/0283670 A1 * | 11/2008 | Harvey | .................. | B64G 1/222 |
| | | | | 244/172.6 |
| 2011/0012003 A1 | 1/2011 | Woodruff et al. | | |
| 2012/0160042 A1 | 6/2012 | Stanev et al. | | |
| 2015/0259911 A1 * | 9/2015 | Freebury | ................ | E04C 3/005 |
| | | | | 52/108 |

\* cited by examiner

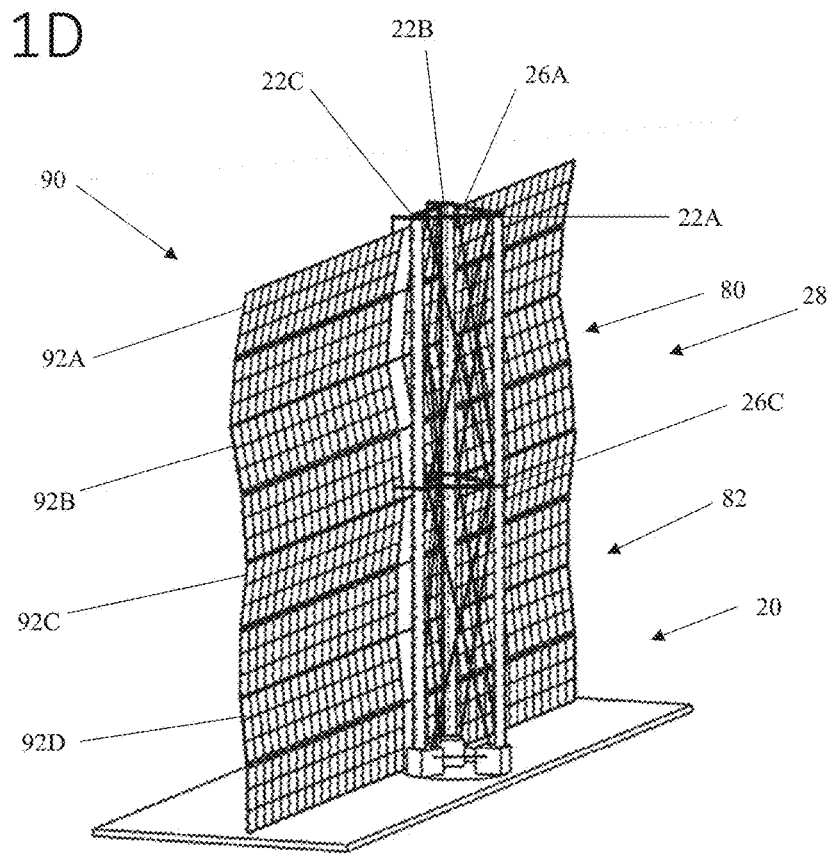

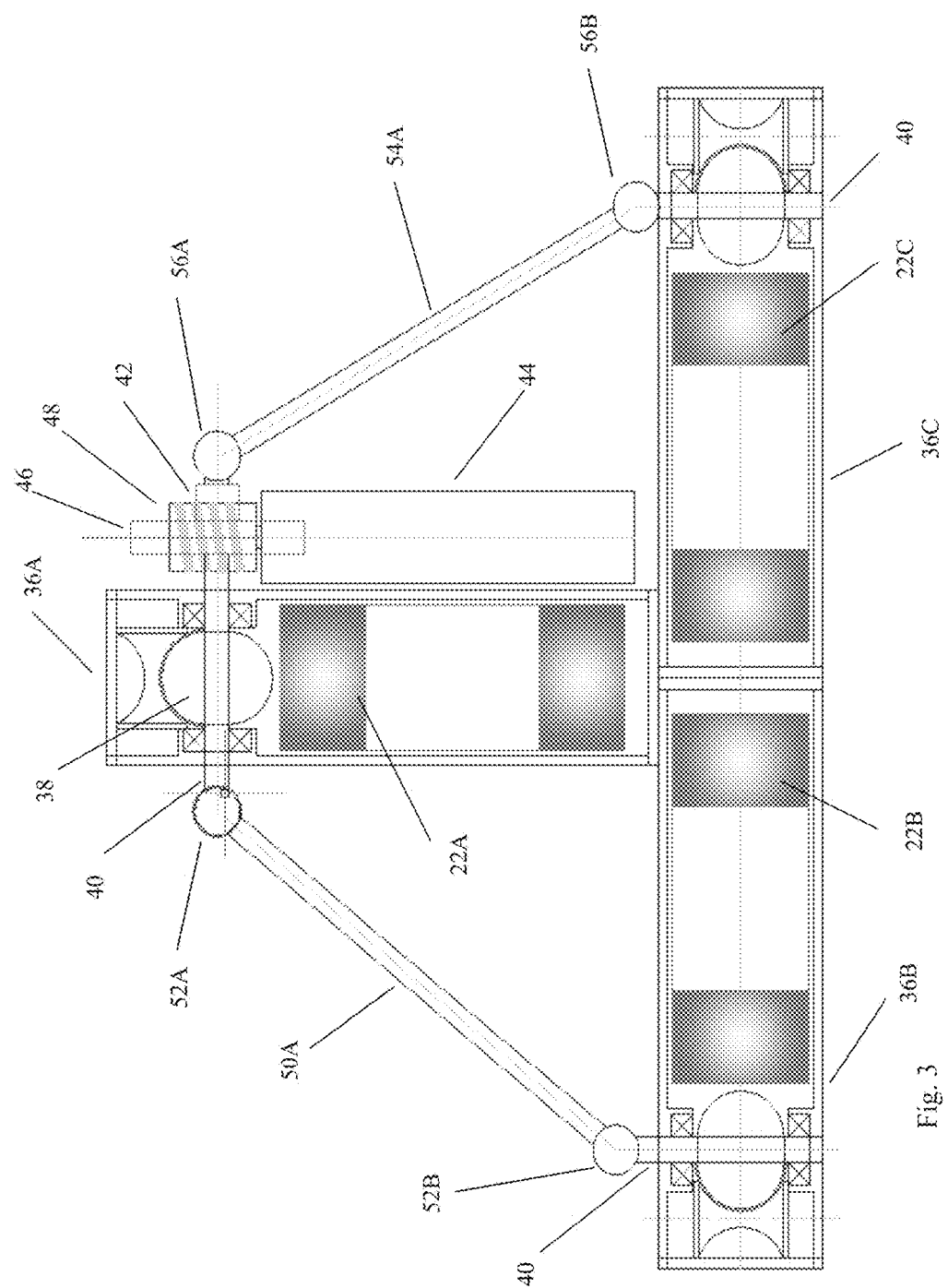

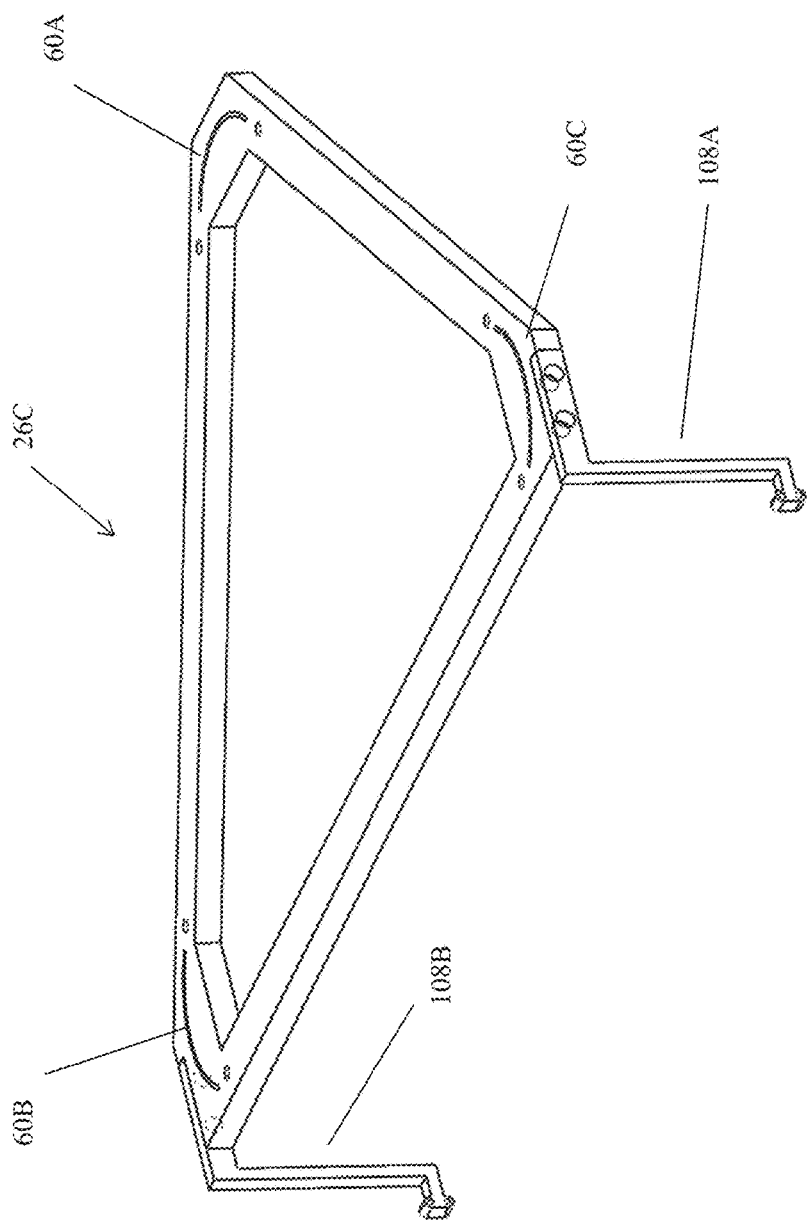

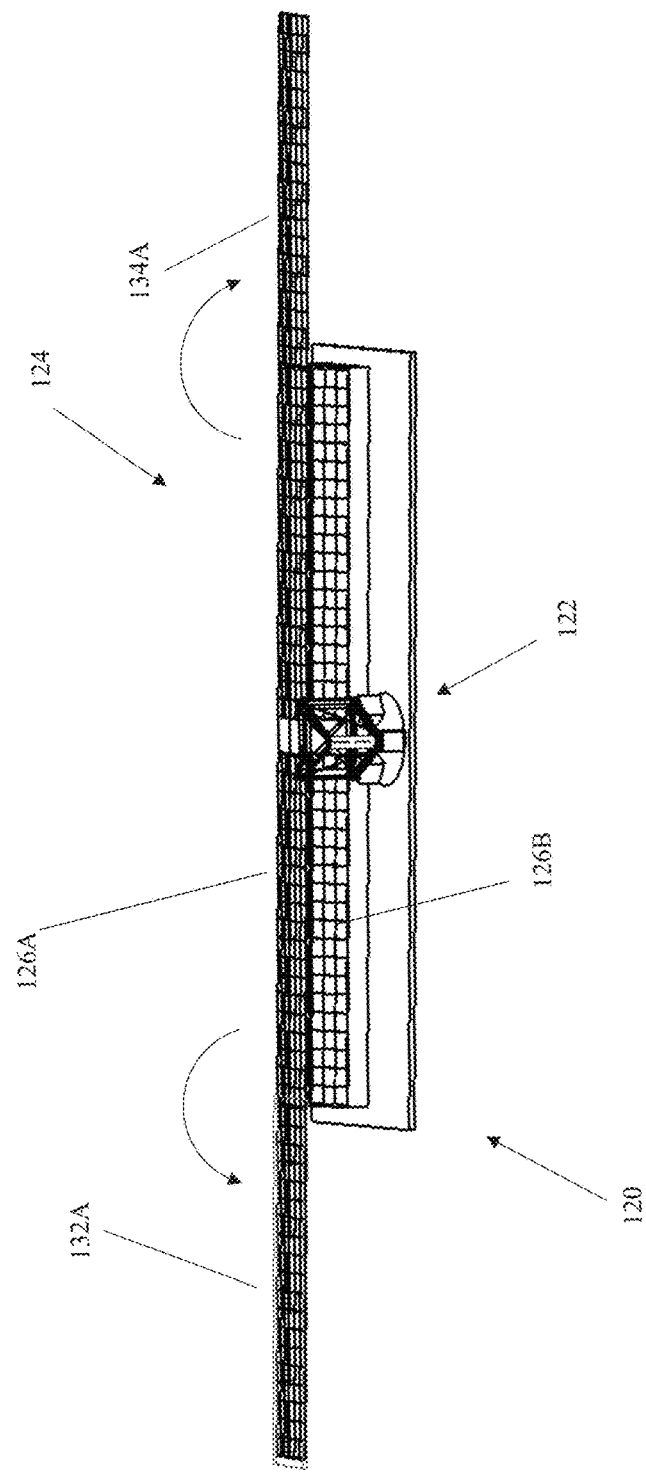

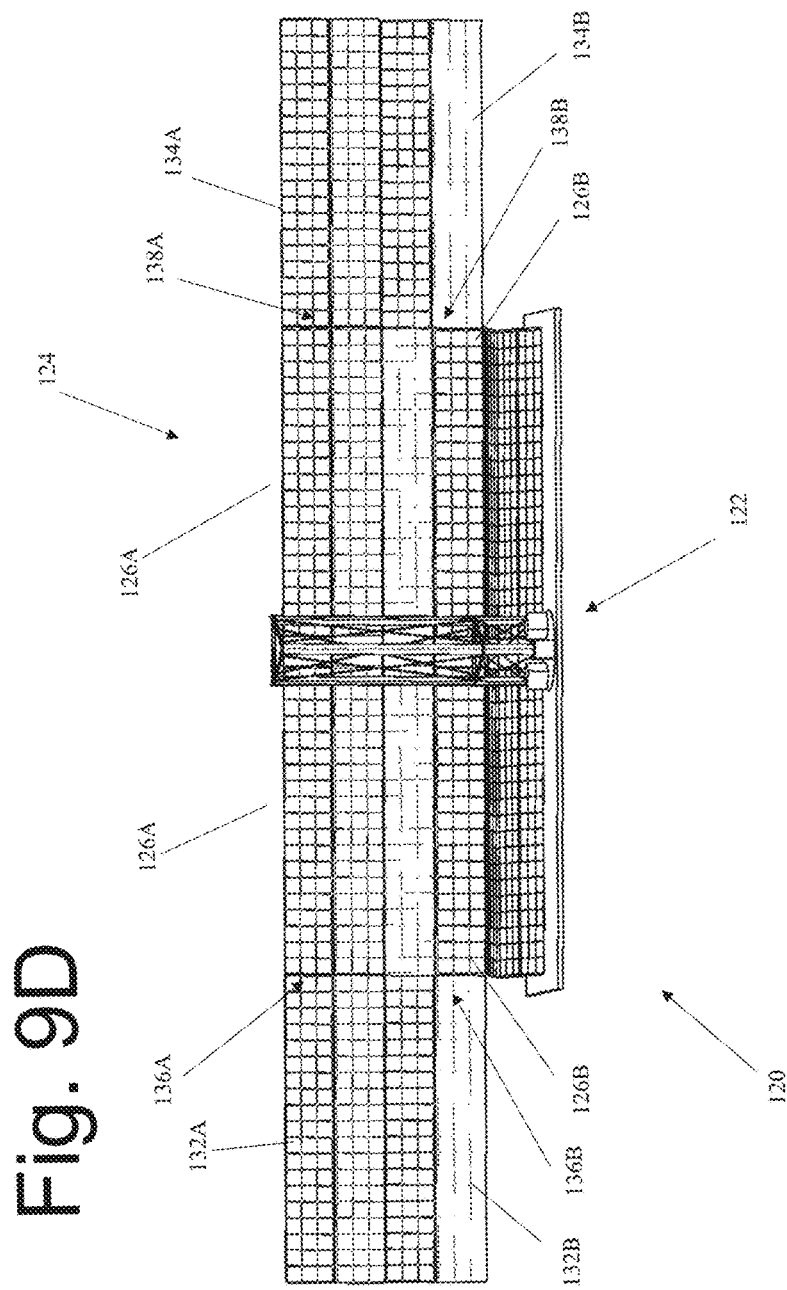

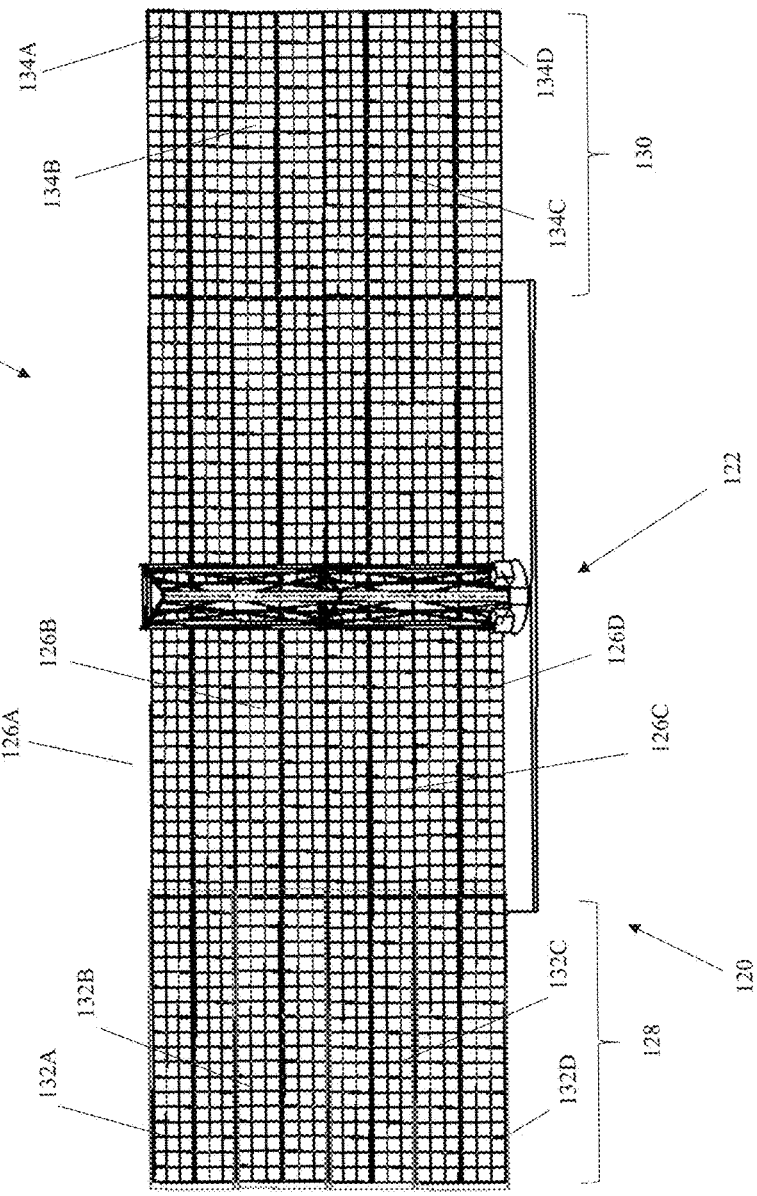

DEPLOYABLE BOOM AND DEPLOYABLE BOOM WITH SOLAR BLANKET

CROSS-REFERENCE TO RELATED APPLICATIONS

This application claims the benefit of U.S. Provisional Patent Application No. 62/188,373 entitled "DEPLOYABLE BOOM AND DEPLOYABLE BOOM WITH A SOLAR BLANKET" and filed on Jul. 2, 2016 for Thomas J. Harvey, et al., which are incorporated herein by reference in its entirety.

FIELD OF THE INVENTION

The invention relates to a deployable boom that can transition from a stowed/undeployed state to an unstowed/deployed state.

BACKGROUND OF THE INVENTION

Generally, a boom is a pole-like structure that is used to lift or support a load. The boom extends from a first terminal end to a second terminal end. In one type of boom, the first terminal end is adapted to engage a platform and the second terminal end is adapted to move relative to the first terminal end. The engagement between the first terminal end of the boom and the platform may be rigid such that the boom has no rotational degrees of freedom relative to the platform or from one to three rotational degrees of freedom relative to the platform.

In one type of boom, the second terminal end of the boom can be moved towards or away from the first terminal end of the boom. A first sub-type of boom in which the second terminal end can be moved in this manner is a hinged boom. A hinged boom includes a first sub-boom that defines the first terminal end of the boom, a second sub-boom that defines the second terminal end of the boom, and a hinge structure that connects the first and second sub-booms and allows rotational movement between the first and second sub-booms.

A second sub-type of boom in which the second terminal end of the boom can be moved relative to the first terminal end of the boom is a telescoping boom. In a telescoping boom the second terminal end of the boom is adapted to move linearly relative to the first terminal end of the boom. In one embodiment, the telescoping boom is comprised of two sub-booms, the first sub-boom defining the first terminal end of the boom and the second sub-boom defining the second terminal end of the boom. The first sub-boom defines a hollow space that is capable of accommodating a substantial portion of the length of the second sub-boom. A motor system (hydraulic, pneumatic, mechanical etc.) is employed to extend and retract the second sub-boom relative to the first sub-boom. Telescoping booms with more than two sub-booms are also known.

A third sub-type of boom in which the second terminal end of the boom can be moved relative to the first terminal end of the boom is a telescoping boom in which the second terminal end of the boom: (a) moves linearly relative to the first terminal end of the boom and (b) rotates about the longitudinal axis of the boom during any linear movement. In particular embodiments of this type of boom, the boom is a lattice/truss structure comprised of multiple longerons that generally extend in the longitudinal direction of the lattice/truss structure, multiple battens that each engage the longerons and extend substantially transverse to the longerons, and multiple diagonals that each extend between two consecutive battens such that the diagonal is not substantially perpendicular to either the battens or the longerons. In one particular embodiment, the longerons are each continuous between the first and second terminal ends. Each longeron is made of a material that allows the longeron or any portion of the longeron to be placed in a first unstrained state or a second strained state. When such a longeron or a portion of the longeron is in the first unstrained state, the longeron or portion of the longeron extends linearly and is capable of maintaining this shape over a range of loads. When the longeron or portion of the longeron is in the second strained state, the longeron or portion of the longeron has been subjected to a force that has caused the longeron or portion of the longeron to adopt a curved shape and store strain energy. The battens are also capable of being deformed between such first and second states. The diagonals are typically made of a flexible material (e.g., thread, wire etc.). The deformable nature of the longerons and battens allows the truss to be coiled. Further, the strain energy stored in the longerons and, to a lesser extent, the battens allows the truss to self-deploy such that the second terminal end of the truss moves linearly away from the first terminal end of the truss and, in so doing, also rotates about a longitudinal axis between the first and second terminal ends. Examples of this type of telescoping boom can be found in U.S. Pat. No. 3,486,279 and U.S. Pat. No. 4,866,892.

In another embodiment of a boom in which the second terminal end of the boom moves linearly relative to the first terminal end of the boom and rotates about the longitudinal axis of the boom during any such linear movement, each of the longerons is comprised of sub-sections that are connected to one another by lockable hinges. When the hinges are unlocked, the longerons and the truss can be coiled. When the hinges are locked, the longerons extend linearly. This particular embodiment of a telescoping boom does not store energy in the longerons or battens when coiled. As such, this particular embodiment of a telescoping boom requires some kind of motor mechanism to move the second terminal end of the boom relative to the first terminal end of the boom.

SUMMARY OF THE INVENTION

The present invention is directed to a deployable tape boom that is capable of transitioning from a stowed/undeployed state to an unstowed/deployed state. In one embodiment, the deployable tape boom includes: (a) a perforated tape that extends from a first terminal end to a second terminal end and when deployed or partially deployed serves as a longeron of the boom, (b) a drive mechanism that includes a sprocket with teeth or cogs that engage the perforations in the tape and a motor mechanism for producing and transmitting the force that is used to rotate the sprocket, and (c) two battens that each engage the perforated tape and provide an interface for engaging a load (e.g., a solar array structure). The first batten is rigidly attached adjacent to the first terminal end of the tape. The second batten is defined by: (a) whatever cog of the sprocket mechanism is engaging a perforation in the tape, where the engaged perforation is the closest perforation to the first terminal end of the tape that is engaged by a cog and (b) the structure that is supporting the sprocket mechanism. The battens, in this particular embodiment, are not conventional battens because there is only one longeron. In the stowed/undeployed state, the sprocket mechanism is engaged with perforations closer to the first terminal end of the tape than the second terminal end of the tape and the boom extends from the first terminal end of the tape to the perforation in the tape that is engaged by the sprocket and closest to the first terminal end of the tape. To deploy the tape boom, the motor mechanism is used to rotate the sprocket, thereby causing the deployable tape boom to transition from the stowed/undeployed state towards the unstowed/deployed state. More specifically, rotation of the sprocket causes the first terminal end of the tape to move farther from the sprocket and the sprocket to engage a perforation or perforations in the tape that are farther from the first terminal end of the tape. The boom now extends from the first terminal end to the perforation that is engaged by the sprocket and closest to the first terminal end. Depending on the load being supported by the deployable tape boom, the drive mechanism can also be used to transition the boom from an unstowed/deployed state towards the stowed/undeployed state.

In another embodiment, the deployable tape boom includes (a) a perforated tape that extends from a first terminal end to a second terminal end and when deployed or partially deployed serves as a longeron of the boom, (b) a drive mechanism that includes a sprocket with teeth or cogs that engage the perforations in the tape and a motor mechanism for producing and transmitting the force that is used to rotate the sprocket, and (c) three or more battens that each engage the perforated tape and provide an interface for engaging a load (e.g., a solar array structure). The first batten is rigidly attached adjacent to the first terminal end of the tape. The second batten is defined by: (a) whatever cog of the sprocket mechanism is engaging a perforation in the tape, where the engaged perforation is the closest perforation to the first terminal end of the tape that is engaged by a cog and (b) the structure that is supporting the sprocket mechanism. However, at least a third batten is disposed between the first and second battens. The third batten is a sliding batten, i.e., a batten through which the tape can slide until a certain length of tape has been deployed. At that point, the location of the batten is fixed relative to the tape. In one embodiment, the location of the batten is at least partially fixed by a lanyard that extends from the sliding batten to a preceding batten (i.e., a batten that is closer to the first terminal end of the tape than the sliding batten). To elaborate, when a certain length of tape has been deployed, the lanyard between the sliding batten and the preceding batten comes taut, thereby at least partially fixing the position of the sliding batten, i.e., the sliding batten is prevented from moving farther away from the preceding batten. In yet another embodiment, the location of the sliding batten is fixed by a detent mechanism that engages one of the perforations in the tape. In yet another embodiment, both a lanyard and a detent are employed to fix the location of a sliding batten relative to the tape.

In a particular embodiment, the deployable tape boom includes a load in the form of a solar array blanket. The solar array blanket, in one embodiment, is comprised of at least four solar panels with intermediate hinge joints between the panels that allow the blanket to be placed in a stowed/undeployed state by Z-folding. In the case of a solar array blanket comprised of four solar panels, three intermediate hinge joints are employed, a first intermediate hinge joint to connect the first panel to the second panel, a second intermediate hinge joint to connect the second panel to the third panel, and a third intermediate hinge joint to connect the third panel to the fourth panel. A first outer hinge joint that is associated with the first solar panel connects the solar array blanket to the first batten that is rigidly attached adjacent to the first terminal end of the tape. A second outer hinge joint that is associated with the fourth solar panel connects the solar array blanket to the second batten defined by the cogs of the sprocket mechanism. The second intermediate hinge joint between the second and third panels is connected to the sliding batten that is located in between the first and second battens. Connecting the solar array blanket to the deployable boom in this manner allows the load of the deployed solar array blanket to be distributed at three locations along the longitudinal extent of the deployed boom instead of at just the two locations that many known booms engage the opposite outer edges of a deployed solar array blanket.

In another embodiment, a deployable tape boom includes: (a) two or more perforated tapes that each extend from a first terminal end to a second terminal end and when deployed or partially deployed serve as a longerons of the boom, (b) a drive mechanism that includes a sprocket mechanism for engaging each of the perforated tapes and a motor mechanism for producing and transmitting the force that is applied to the sprocket mechanism to move the first terminal end of each of the perforated tapes relative to the sprocket mechanism, and (c) two or more battens that each engage the perforated tapes and provide an interface for engaging a load (e.g., a solar array structure). Since the perforated tapes form longerons in the deployed state and the battens extend between the longerons, the battens in this embodiment are convention battens. In an embodiment employing two battens, the first batten is rigidly attached adjacent to the first terminal end of the tape. The second batten is defined by: (a) whatever cog of the sprocket mechanism is engaging a perforation in the tape, where the engaged perforation is the closest perforation to the first terminal end of the tape that is engaged by a cog and (b) the structure that is supporting the sprocket mechanism. In embodiments that employ three or more battens, there is at least a third batten located between the first and second battens that is a sliding batten. When three or more battens are employed, the location of any sliding batten is at least partially fixed by a lanyard that extends from the sliding batten to a preceding batten. In certain embodiments, the lanyard that extends between a sliding batten and another batten and serves to at least partially fix the position of the sliding batten relative to the tape also serves, when taut, as a diagonal in the boom structure. A detent mechanism can also be employed to facilitate the fixing of the location of a sliding batten relative to the tape. Further, a combination of a lanyard/diagonal and detent mechanism can be employed to fix the location of a sliding batten relative to the tape. In a particular embodiment, the deployable tape boom includes a cassette for each lanyard that stores the lanyard when the boom is in an undeployed state and gradually feeds the lanyard out during deployment, thereby preventing the lanyard from engaging other structures and potentially fouling the deployment.

In one embodiment that employs three of more battens and three or more tapes, the stowed/undeployed state is characterized by the battens being positioned so as to form a laminate structure with a height that is substantially equal to the cumulative thicknesses of the battens. To deploy the tape boom from this stowed/undeployed state, the motor mechanism applies force to the sprocket mechanism, thereby causing each of the three or more perforated tapes to transition from the stowed/undeployed state towards the unstowed/deployed state. More specifically, actuation of the sprocket mechanism causes the first terminal end of each of the tapes to move farther from the sprocket mechanism and the sprocket mechanism to engage perforations in the tapes that are farther from the first terminal ends of the tapes. Initially, the tapes are sliding through each of the sliding battens. Eventually, the first terminal ends of the tapes reach a distance from the sprocket mechanism at which the lanyard/diagonal structure extending between the first batten and the sliding batten that was immediately adjacent to the first batten in the laminate structure comes taut. Further deployment of the tapes results in the sliding batten being separated from the next underlying batten. Yet further deployment of the tapes results in the diagonal structure extending between the sliding batten and the next underlying batten coming taut. If the next underlying batten is the second batten, then the deployment is complete. If the next underlying batten is a sliding batten (i.e., a second sliding batten), then further deployment of the tapes results in the diagonal structure between the first and second sliding battens causing the second sliding batten to be separated from the next underlying batten. The deployment of the tapes continues until the diagonal structure extending between the last sliding batten and the second batten comes taut.

BRIEF DESCRIPTION OF THE DRAWINGS

FIGS. 1A-1D shown an embodiment of the deployable boom transitioning from a fully stowed/undeployed state to a fully unstowed/deployed state;

FIG. 3 is a schematic diagram of the drive or motor mechanism employed in the embodiment of the boom shown in FIGS. 1A-1D;

FIG. 5 illustrates the sliding batten used in the embodiment of the boom shown in FIGS. 1A-1D;

FIGS. 9A-9E illustrates another embodiment of a deployable boom with a solar blanket that includes a number of panels that deploy in a first dimension and a number of panels that deploy in a second dimension.

DETAILED DESCRIPTION

Figure 1A:
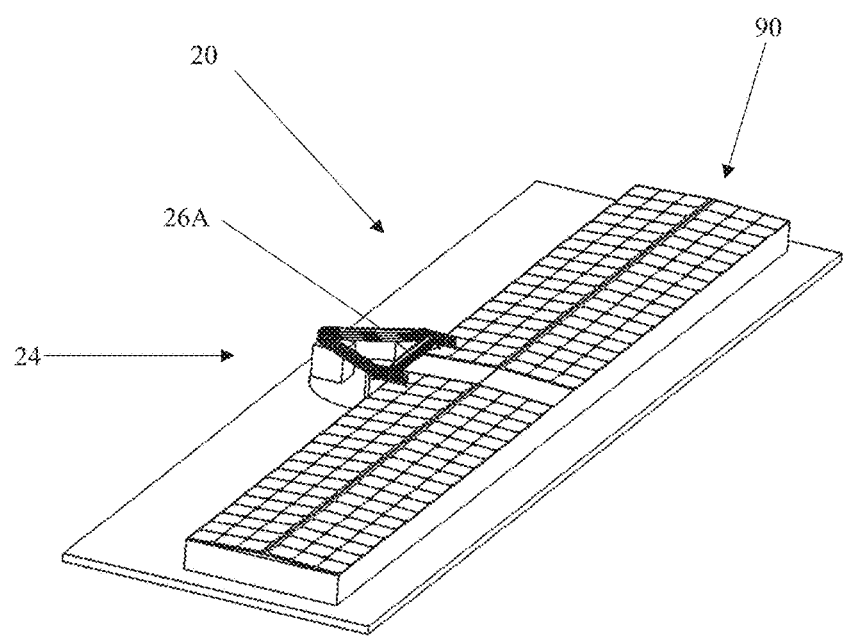
Figure 1B:
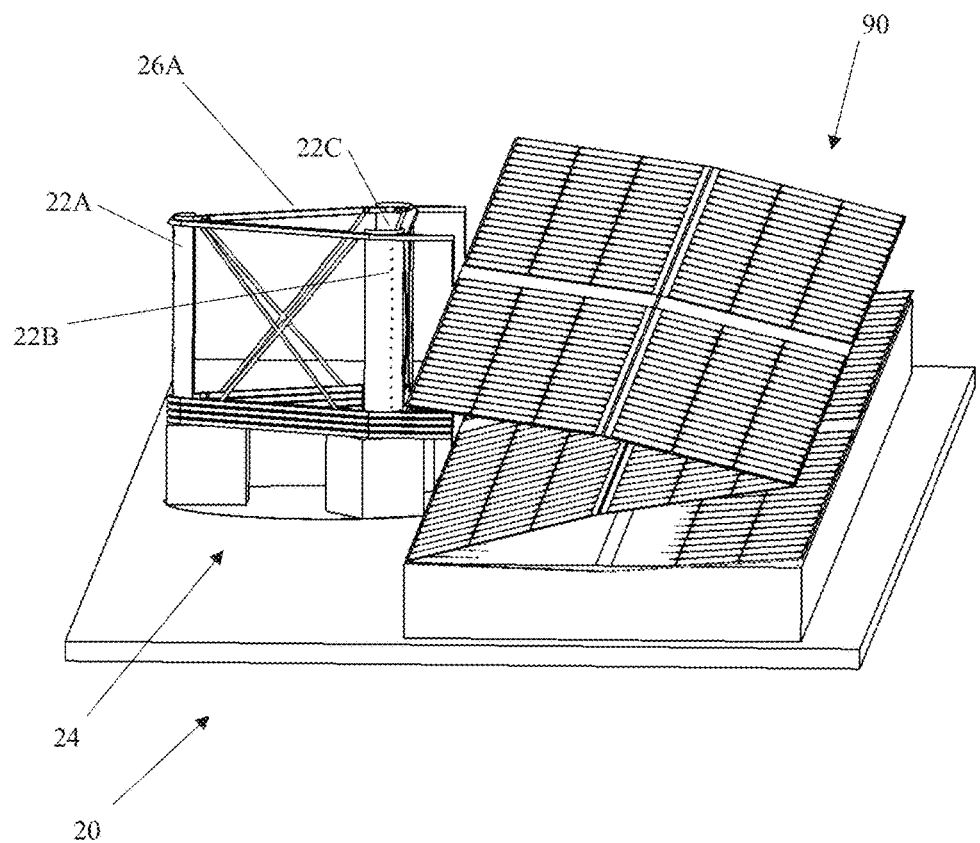

With reference to FIGS. 1A-1D and 2A-2B, an embodiment of a deployable tape boom 20 that is capable of transitioning between a stowed/undeployed state to an unstowed/deployed state is described. Generally, the deployable tape boom 20 (hereinafter "boom 20") includes (a) perforated tapes 22A-22C that each extend from a first terminal end to a second terminal end, (b) a drive mechanism 24 for use in transitioning the tapes 22A-22C between an undeployed state and a deployed state in which at least a portion of each the tapes extends linearly from its first terminal end towards its second terminal end, (c) a first batten 26A that is fixedly engaged to each of the perforated tape 22A-22C adjacent to the first terminal ends of the tapes, (d) a second batten 26B that is formed (at least in part) by the structures of the drive mechanism that are engaging the perforated tapes 22A-22C at any point in time, (e) a sliding batten 26C that is located between the first and second battens 26A, 26B, (f) a diagonal system 28 that includes a first set of flexible filaments that diagonally extend between the first batten 26A and the sliding batten 26C when deployed, a second set of flexible filaments that extend between the second batten 26B and the sliding batten 26C when deployed, and a first set of three cassettes 30A and a second set of three cassettes 30B, with each cassette adapted to store two of the flexible filaments when the boom 20 is in a stowed/undeployed state and to dispense the two filaments when the boom is transitioning between the stowed/undeployed and unstowed/deployed states.

Each of the deployable tapes 22A-22C is a type of tape that is commonly referred to as a carpenter's tape, i.e., a tape that (a) longitudinally extends from a first terminal end to a second terminal end (b) is capable of being placed in a Archimedean spiral roll with the first terminal end being located on the outermost portion of the roll and the second terminal being located on the innermost portion of the roll; (c) is capable of being partially or completely unrolled, (d) has a lateral cross-section that is linear at any rolled portion, and (d) has a lateral cross-section that is curved at any unrolled portion. Each of the tapes 22A-22C in boom 20 is made from steel. Other materials can be used for the tapes. In a preferred embodiment, each of the tapes is made from a carbon-fiber composite that, in addition to having the aforementioned properties of a carpenter's tape, also has two stable phases. The first stable phase is characterized by the entire tape in a rolled state. The second phase is characterized by the entire tape being in the unrolled state. If such a tape is partially unrolled (i.e., in an intermediate state), the tape will self-transition towards one of the two stable states. Such a tape is desirable in outer space related applications and other applications in which the boom may need to be in a stowed/undeployed state for a considerable period of time. In such situations, the tapes will likely be in the first stable phase or in an intermediate phase in which the tape will attempt to self-transition towards the first stable phase. As such, little or no energy needs to be expended in keeping the tape in this undeployed or substantially undeployed state. While the boom 20 utilizes the three tapes 22A-22C, it should be appreciated that a boom that utilizes four or more tapes is also feasible.

Figure 4A:
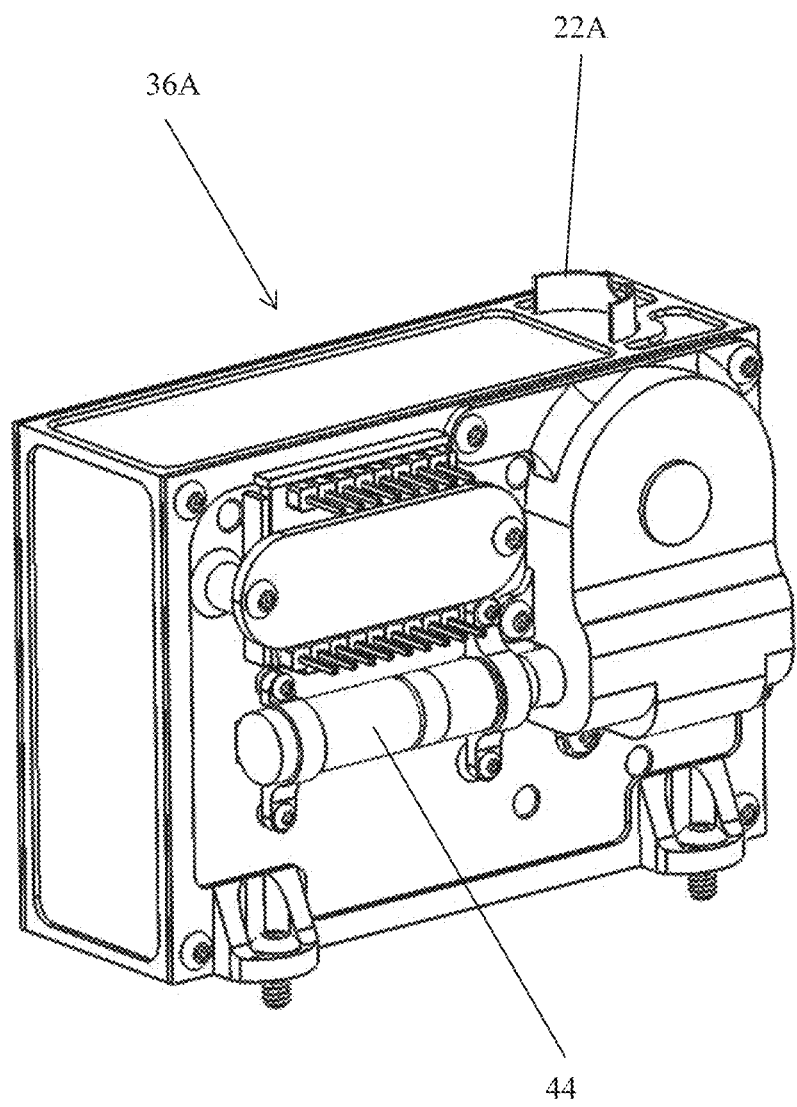
FIGS. 4A and 4B illustrate one of the tape cassettes employed in the drive mechanism schematically illustrated in FIG. 3.
Figure 4B:
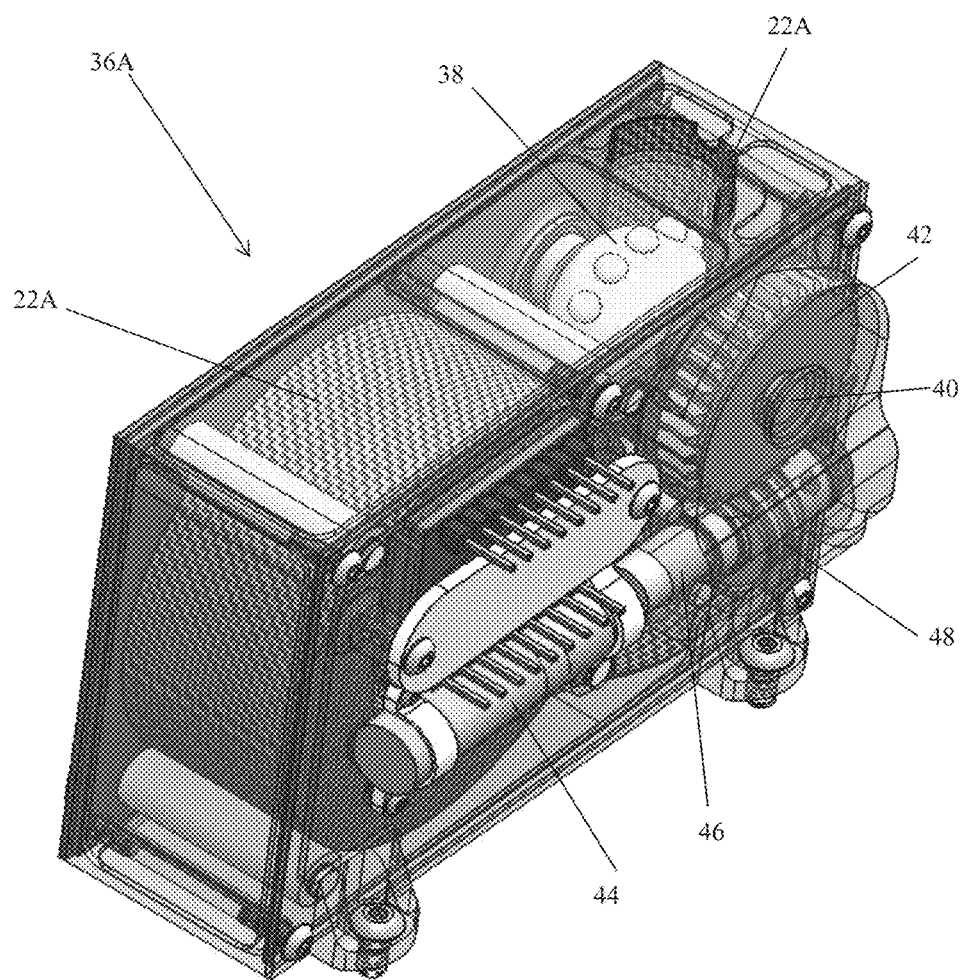
Figure 6A:
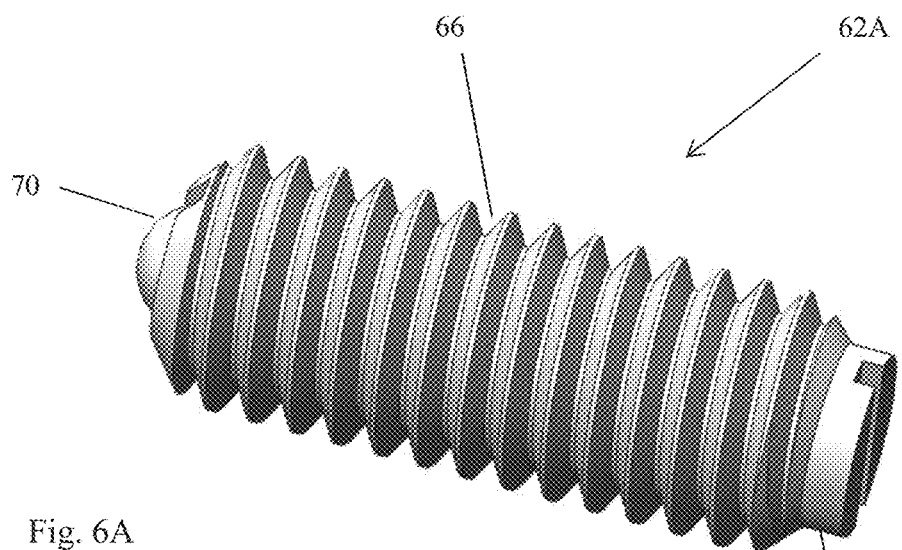
FIGS. 6A and 6B respectively illustrate the exterior of a detent mechanism and a cross-section of the detent mechanism this is employed in the sliding batten shown in FIG. 5.
Figure 6B:
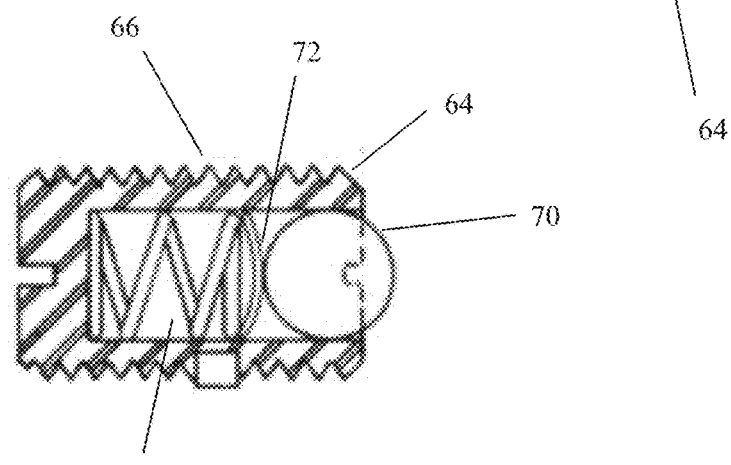
Figure 7A:
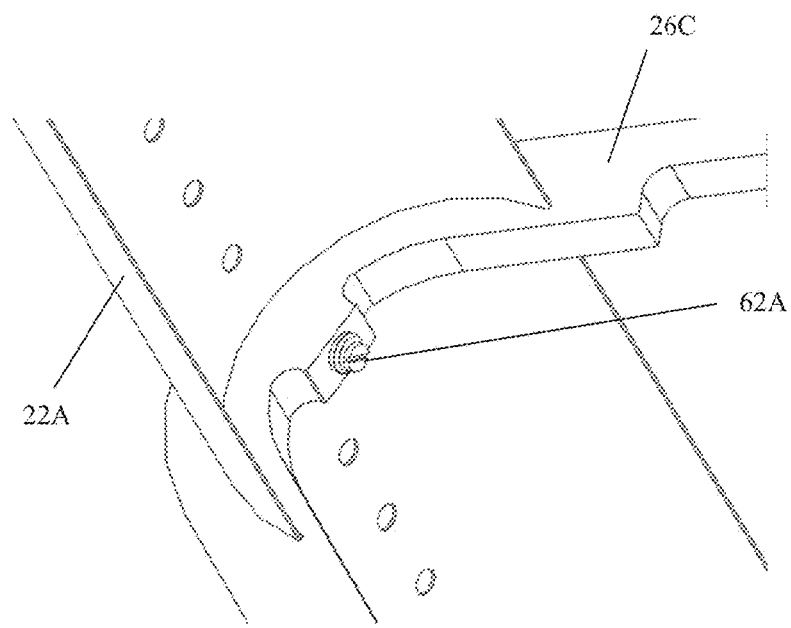
FIG. 7A illustrate the detent mechanism illustrated in FIGS. 6A and 6B operatively attached to the sliding batten.
Figure 7B:
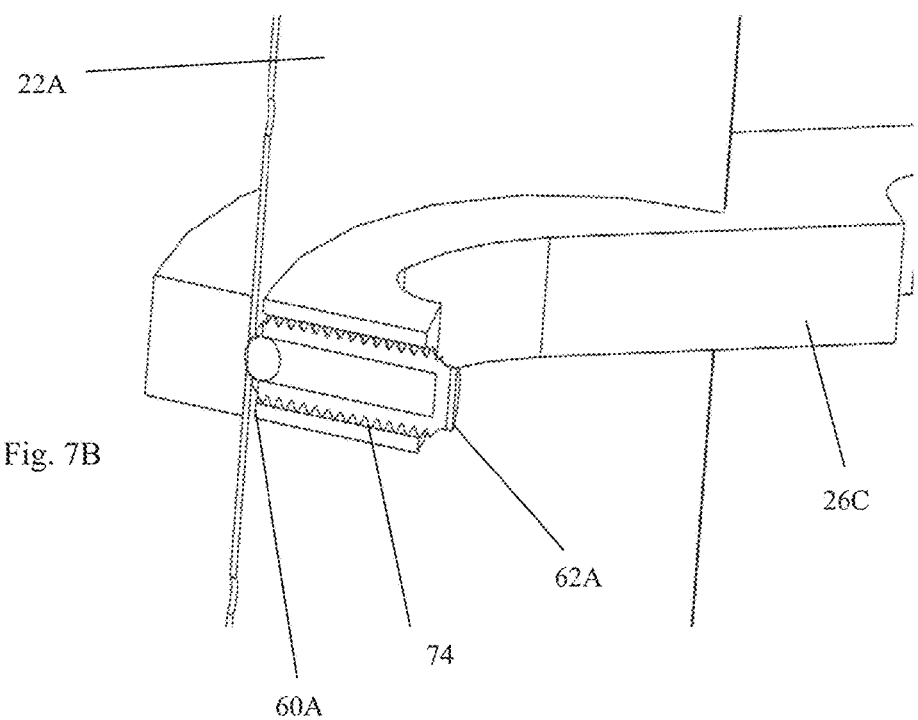
FIG. 7B illustrates the detent mechanism, sliding batten, and tape of FIG. 7A in cross-section.

With reference to FIGS. 3, 4A, and 4B, the drive mechanism 24 includes three tape cassettes 36A-36C that are each adapted to store one of the tapes 22A-22C or a substantial portion of such a tape in a rolled state. Further, each of the cassettes 36A-36C includes sprocket wheel 38 disposed on a drive axle 40. Each sprocket wheel 38 has a plurality of cogs extending outwards from the wheel with each cog sized to engage the perforations in the associated tape stored in the cassette. Rotation of the sprocket wheel 38 about the drive axle 40 in one direction causes the first terminal end of the relevant tape to move away from the cassette. Rotation of the sprocket wheel in the opposite rotational direction causes the first terminal end of the relevant tape to move towards the cassette. Associated with the drive axle 40 of one of the tape cassette 36A are a drive gear 42 and a drive motor 44 with a drive shaft 46. The drive motor 44 includes a worm gear 48 that is operatively engaged to the drive shaft 46. The drive motor 44 operates, via the drive shaft 46, worm gear 48, and drive gear 42 to provide rotational force (clockwise and/or counter-clockwise) to the drive axle 40 and the sprocket wheel 38 to linearly move the first terminal end of the tape in the desired direction. The drive motor 44, in addition to being controllable as to the direction of rotation, can also be controlled as to rotational speed.

The drive axle 40 of the of the tape cassette 36A is coupled to the drive axles of the tape cassettes 36B, 36C by a transmission system that applies the rotational force produced by the drive motor 44 to the sprocket wheels associated with the tape cassettes 36B, 36C and synchronizes the movement of the tapes with one another. The transmission system include a first transmission axle 50A, a first u-joint 52A that connects the drive axle 40 of the tape cassette 36A and the first transmission axle 50A, and a second u-joint 52B that connects the first transmission axle 50A to the drive axle 40 of the tape cassette 36B. The transmission system also includes second transmission axle 54A, a first u-joint 56A that connects the drive axle 40 of the tape cassette 36A and the second transmission axle 54A, and a second u-joint 56B that connects the second transmission axle 54B and the drive axle 40 of the tape cassette 36C. Other structures known to those skilled in the art can be used to synchronize the extension/retraction of the tapes 22A-22C to/from the tape cassettes 36A-36C.

Figure 2A:
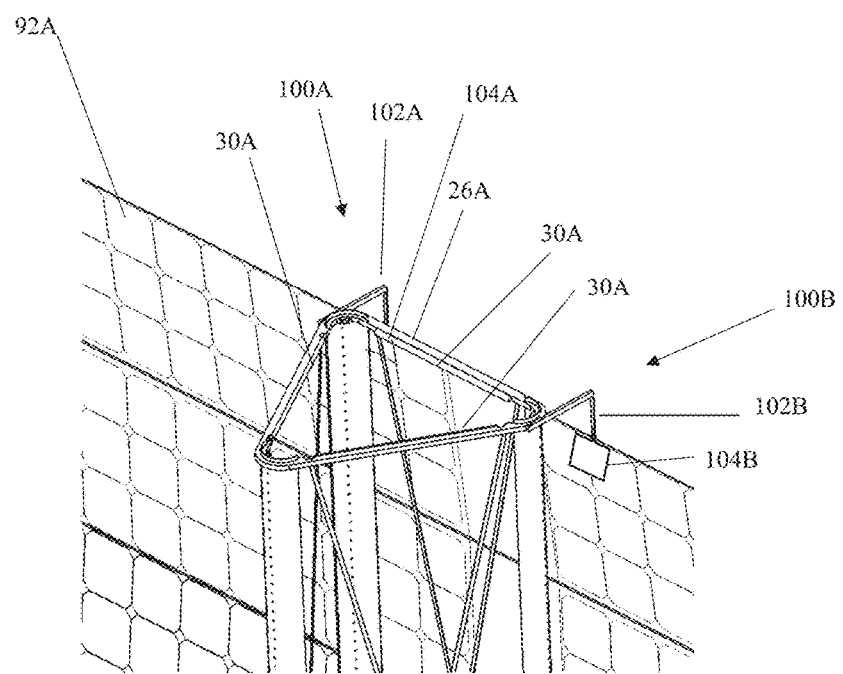
FIG. 2A shows the first batten and related structure of the embodiment of the boom shown in FIGS. 1A-1D.

With reference to FIG. 2A, the first batten 26A is a triangularly shaped member that is fixedly engaged to each of the tapes 22A-22C adjacent to the first terminal end of each of the tapes. The first batten 26A, in the illustrated embodiment, is made of aluminum. However, other materials, such as carbon-fiber, can also be employed.

Figure 2B:
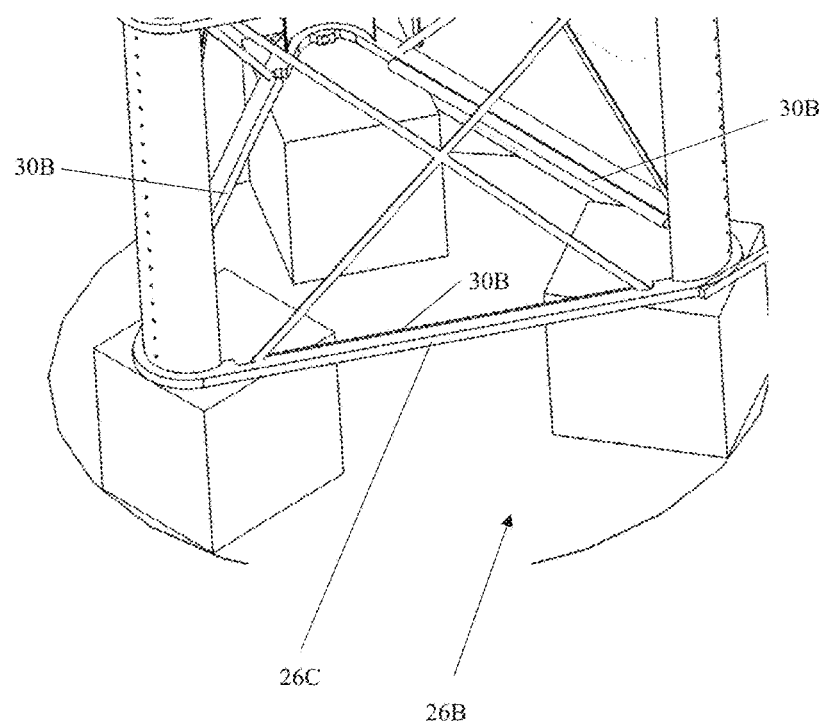
FIG. 2B shows the sliding batten and related structure of the embodiment of the boom shown in FIGS. 1A-1D.

With reference to FIGS. 1D and 2B, the second batten 26B is defined by: (a) the cog associated with each of the three sprocket wheels that is engaging a perforation in one of the three tapes 22A-22C and, because several cogs associated with a wheel may be engaging a tape at any given time, the cog that is engaging the perforation closest to the first terminal end of the tape and (b) the structure that is supporting the cogs wheels. Because the sprocket wheels rotate to move the tape, it should be appreciated that the cogs that define the second batten 26B change during movement of the tape. However, the position of the second batten 26B relative to whatever structure is supporting the tape cassettes 36A-36C is substantially static whether the tapes are moving or not moving relative to the cassettes.

With reference to FIG. 5, the sliding batten 26C is a triangularly shaped member with three arc-shaped holes 60A-60C, one located at each of the three corners of the batten. The arc-shaped holes 60A-60C respectively engage deployed (linear) portions of the three tapes 22A-22C in a manner that allows the tapes to slide through the holes. Associated with the sliding batten 26C are three detent mechanisms, one associated with each of the three corners of the batten. Each of the three detent mechanisms is adapted to engage the perforations in one of the three tapes 22A-22C. With reference to FIGS. 6A-6B and 7A-7B, the detent mechanism 62A that is adapted to engage perforation associated with tape 22A is described with the understanding the other two detent mechanisms are substantially identical. The detent mechanism 62A is comprised of a housing 64 with an exterior thread 66 and a hollow interior space 68 that supports a ball 70 and spring 72 that biases the ball away from the housing. The exterior thread 66 of the housing 64 is adapted to engage a threaded hole 74 that extends from the exterior of the batten 26C to the arc-shaped hole 60A. The detent mechanism 62A operates so that the spring 72 forces the ball 70 into each perforation of tape 22A when the tape is moving relative to the sliding batten 26C. However, the movement of the tape 22A will apply enough force to the ball 70 and to the spring 72 so as to compress the spring and allow the ball to be displaced out of a perforation. Once the tape stops moving, the spring 72 will bias the ball 70 into any perforation that is substantially aligned with the ball 70 when movement of the tape 22A ceases.

The diagonal system 28 is comprised of a first set of three pairs of crossing diagonal members 80 with each pair of crossing diagonal members extending between and engaging the first batten 26A and the sliding batten 26C and a second set of three pair of crossing diagonal members 82 with each pair of crossing diagonal members extending between and engaging the second batten 26B and the sliding batten 26C. Each diagonal member is made from a flexible filament (e.g., wire, thread, carbon-fiber thread etc.). As such, each diagonal member functions as diagonal in a truss when the member becomes taut. The first set of diagonal members, in addition to providing an element of truss when taut, also partly fixes the position of the sliding batten 26C relative to the tapes 22A-22C. To elaborate, at a predetermined point during the deployment of the tapes 22A-22C, the first batten 26A has been displaced a distance from the sliding batten 26C at which the first set of three pairs of crossing member come taut. At this point, the tapes 22A-22C can no longer slide through the arc-shaped holes 60A-60C of the sliding batten 26C. As such, the position of the sliding batten 26C is partially fixed because the sliding batten 26C is prevented from moving farther away from the first batten 26A by the first set of three pairs of crossing diagonal members that are now taut. At this point, each of the tapes 22A-22C also has a perforation that is substantially aligned with the ball of the corresponding one of the detents 62A-62C. As such, the detents 62A-62C also operate at this point to fix the sliding batten 26C in place relative to the tapes 22A-22C such that the batten is substantially prevented from moving either towards or away from the first batten 26A. In certain embodiments, the first set of crossing diagonal members 80 may sufficiently fix the sliding batten 26C in place relative to the tapes 22A-22C and the detents 62A-62C considered unnecessary. It should also be appreciated that at this point, a truss structure comprised of a first bay has been formed. A bay is comprised of two consecutive battens, the longerons extending between the two consecutive battens, and the diagonals extending between the two consecutive battens. The first bay is comprised of the first batten 26A and sliding batten 26C, the longerons formed by the linear portions of the tapes 22A-22C that extend between these two battens, and the deployed first set of three pairs of crossing diagonal members 80 (now taut). Further deployment of the tapes results in the formation a truss structure comprised of two bays, the first bay and a second bay that is defined by the sliding batten 26C and the second batten 26B, the longerons formed by the linear portions of the tapes 22A-22C that extend between these two battens, and the deployed second set of three pairs of crossing diagonal members 82 (now taut). It should be appreciated that, in certain embodiments, one or more diagonals that extend over two or more bays may be desirable. Further, other embodiments that employ four or more tapes, may employ one or more diagonals that extend across the interior space defined by the deployed tapes. For instance, in a four tape embodiment, such diagonals could define an X-shape when viewed from the end of the deployed boom. In a five tape embodiment, such diagonals could extend from a point adjacent to a first tape to points adjacent to the third and fourth tapes (when moving clockwise/counter-clockwise from the first tape) thereby have a five-pointed star-shape when viewed from the end of the deployed boom.

In the illustrated embodiment, the boom 20 is supporting a load in the form of a solar array blanket 90 that is comprised of four solar panels 92A-92D with consecutive pairs of the panels connected to one another with intermediate hinge joints that allow the blanket to be placed in a stowed/undeployed state by Z-folding. The stowed/undeployed blanket 90 has a laminate characteristic as shown in FIG. 1A. In a preferred embodiment, each of the solar panels has a single-piece panel that supports one or more solar cells and has a shallow V-shape that renders the panel relatively stiff and provides other advantages. An example of such a solar panel is described in U.S. patent application Ser. No. 14/447,350, which is incorporated herein by reference in its entirety.

Figure 1C:
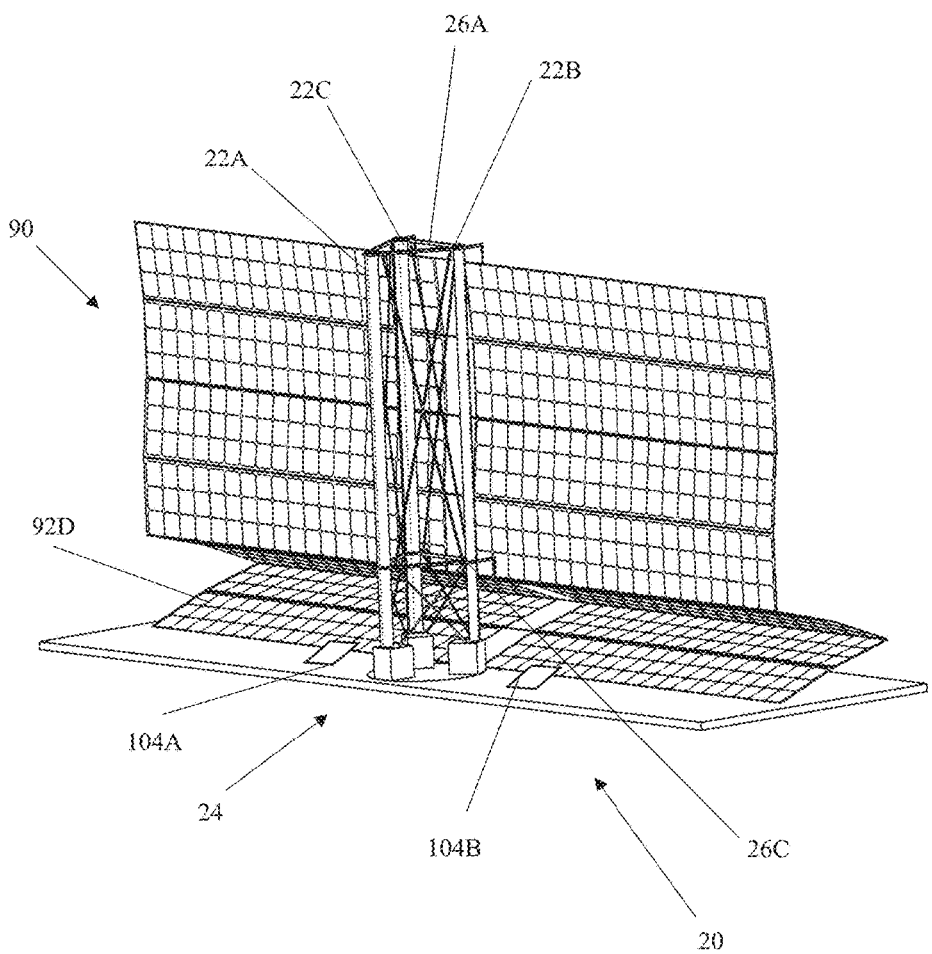
Figure 8A:
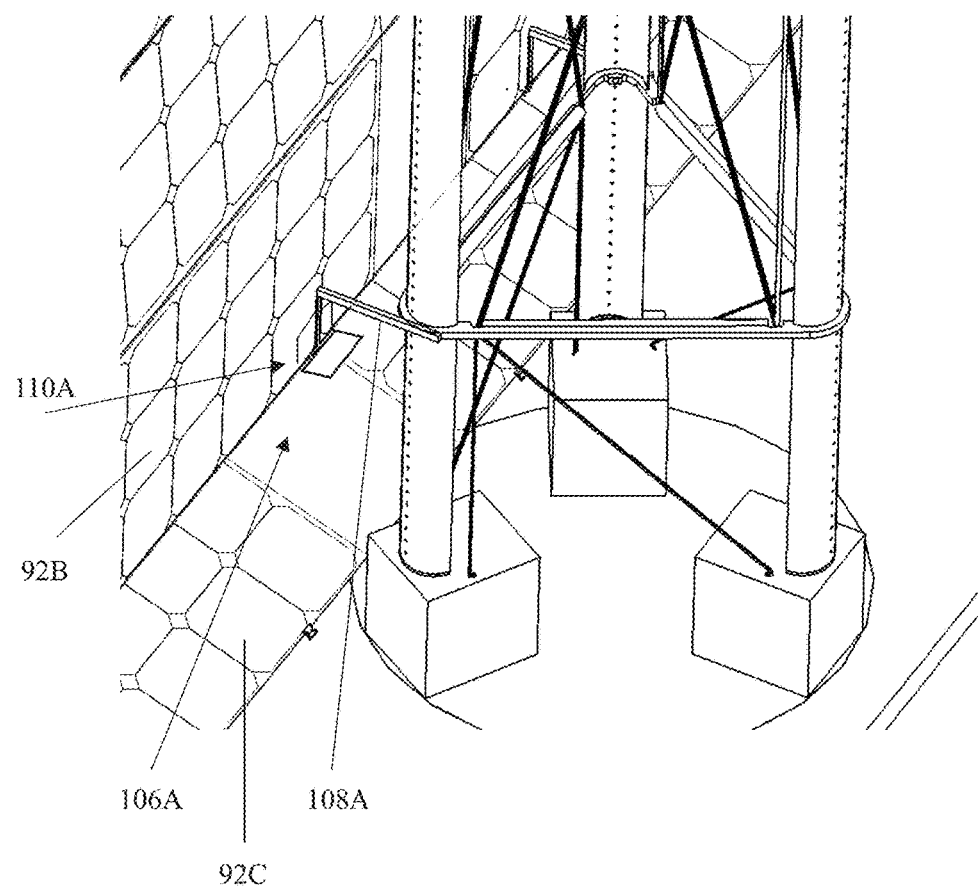
FIG. 8A illustrates one of the two double-barrel hinges used to connect the sliding batten to a solar blanket.
Figure 8B:
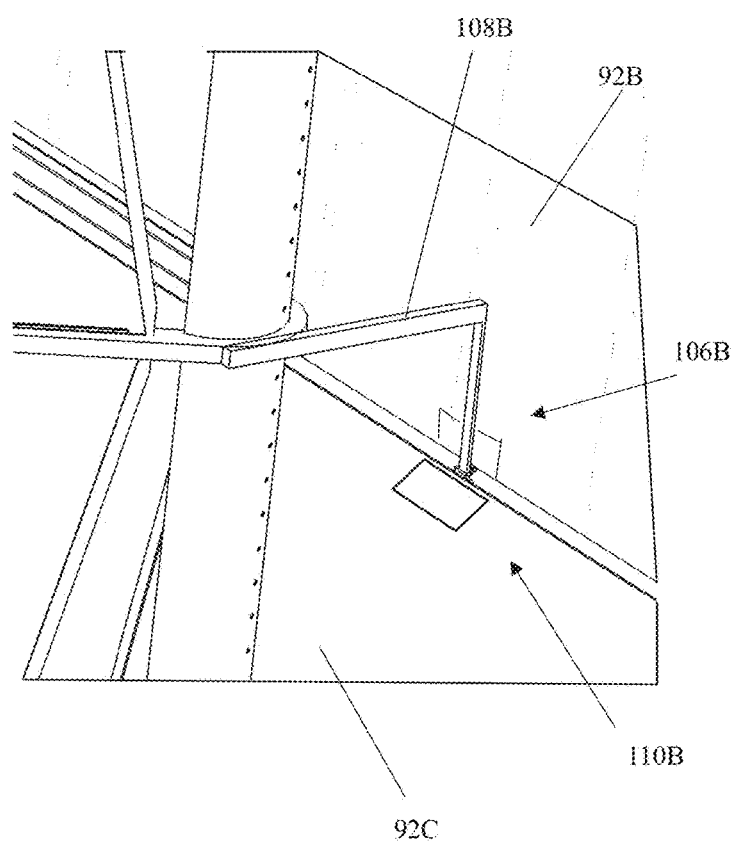
FIG. 8B illustrate the other one of the two double-barrel hinges used to connect the sliding batten to the solar blanket.
Figure 9A:
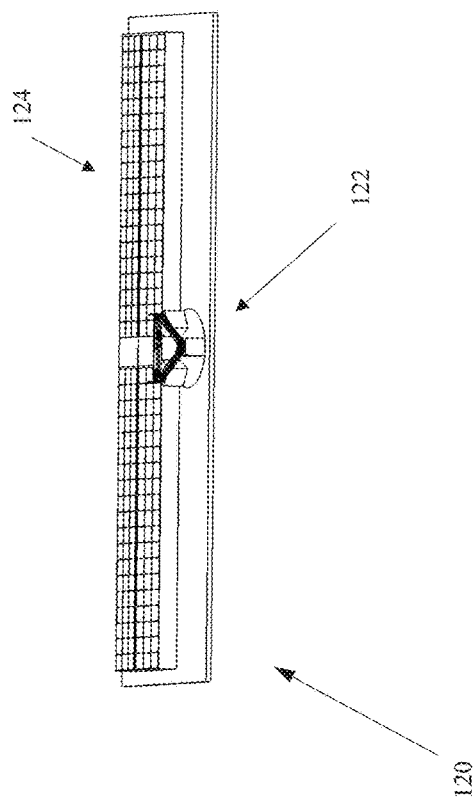
Figure 9B:
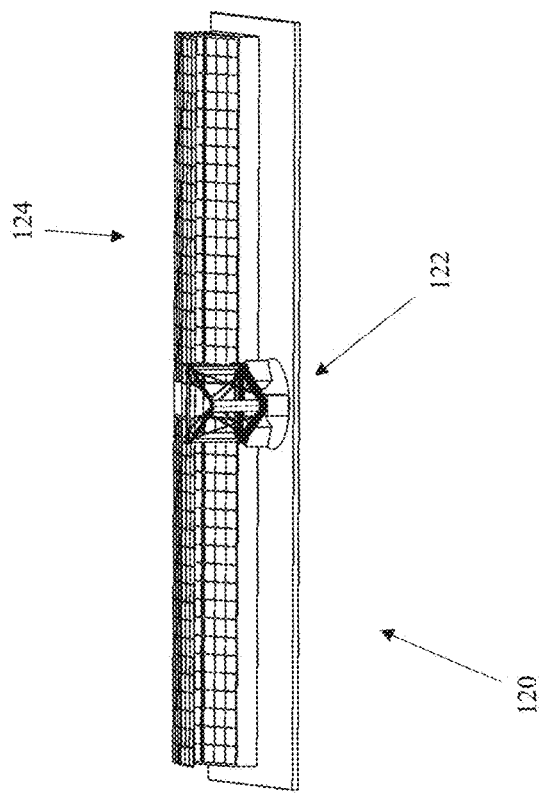

The boom 20 is engaged to the solar array blanket 90 with three hinge structures that are associated with the first batten 26A, second batten 26B, and sliding batten 26C. With reference to FIG. 2A, the first hinge structure is comprised of two aligned barrel hinges 100A, 100B. The barrel hinges 100A, 100B are respectively comprised of: (a) L-shaped leafs 102A, 102B that each have a first end that is connected to the first batten 26A and a second end that forms a barrel structure, (b) panel leafs 104A, 104B that are each connected to the solar panel 92A and define a barrel structure that cooperates with the barrel structure of the corresponding L-shaped leaf, and (c) pins that extend through the aligned barrels of leafs 100A, 104A and the aligned barrels 100B, 104B. With reference to FIG. 1C, the second hinge structure comprised of two aligned barrel hinges connects the second batten 26B (which includes structure that supports the sprocket wheels) to panel 92D. With reference to FIGS. 8A and 8B, the third hinge structure is comprised of two aligned double-barrel hinges 106A, 106B that each connects the sliding batten 26C to both panel 92B and panel 92C. The double-barrel hinges 106A, 106B respectively employ (a) L-shaped leafs 108A, 108B that each have a first end that is connected to the sliding batten 26C and a second end that forms a pair of parallel barrel structures, (b) double panel leafs 110A, 110B that each have a leaf with a barrel structure that is connected to solar panel 92B and another leaf with a barrel structure that is connected to solar panel 92C, and (c) pins that extend through the two groups of aligned barrels associated with each of the hinges 106A, 106B.

It should be appreciated that the boom 20 is capable of being adapted to support structures other than a solar blanket. For instance, the boom 20 can be adapted to support a deployable antenna that, like the solar blanket 90, is supported at multiple points along the length of the boom. As another example, the boom 20 can be adapted to support a measurement instrument located at the end of the boom 20 or at a location intermediate the ends of the boom. The boom is also adaptable to support multiple structures along its length. For instance, the boom 20 can be adapted to support a solar array and an antenna or other instrument.

The boom 20 is capable of realizing an expansion ratio (ratio of the height of the deployed boom to the height of the undeployed boom) of at least 35:1. To elaborate, the height of the stowed/undeployed boom 20 is substantially determined by the sum of (a) the height of the battens 26A-26C when stowed (i.e., when the battens form the laminate structure shown in FIG. 1A) and (b) the diameter one of the stowed/undeployed tapes 22A-22C. In the fully deployed state, the height of the boom 20 is substantially the length of one of the deployed tape 22A-22C. Due to the relatively small height of the undeployed boom and the significant length of tape that can be disposed in an Archimedean roll, the boom 20 realizes a significant expansion ratio, namely, at least 35:1.

With reference to FIGS. 9A-9E, another embodiment of a deployable boom with a blanket solar array 120 (hereinafter "boom 120") is described. The boom 120 includes three perforated tapes, a drive mechanism, multiple battens with one batten being a sliding batten, and a diagonal system (collectively referred to as deployment mechanism 122) and a solar array blanket 124. The noted elements of the deployment mechanism 122 are substantially identical to those described with respect to the boom 20. However, the solar array blanket 124 is different than the solar array blanket 90. To elaborate, the solar array blanket 124 includes four panels just like solar array blanket 90. These are central panels 126A-126D. Each of the central panels 126A-126D is of the type of panel taught in U.S. patent application Ser. No. 14/447,350 (which is incorporated herein by reference), characterized as being relatively stiff and having a shallow-dished or shallow V-shape. The solar blanket 124 includes a first set of wing panels 128 that are pivotally connected to the central panels and a second set of wing panels 130 that are pivotally connected to the central panels. The first set of wing panels 128 includes four wing panels 132A-132D. The second set of wing panels 130 includes four wing panels 134A-134D. Each of the wing panels is of the type of panel taught in U.S. patent application Ser. No. 14/447,350, characterized as being relatively stiff and having a shallow-dished or shallow V-shape. Each of the wing panels is connected to a central panel by a pivotal connection that allows the wing panel to be rotated such that the panel overlies a central panel and can be rotated away from a central panel so as to be disposed substantially planar with the central panel. Associated with the pivotal connection is a bias mechanism that causes the wing panel to rotate away from the central panel when not constrained in the position in which the wing panel is folded over the central panel. Also associated with the pivotal connection is a mechanism that limits the extent to which the wing panel rotates away from the central panel. A pivot connection structure that allows a wing panel to rotate away from a central panel, provides a bias mechanism for causing the rotation, and provides a limit to the extent of the rotation is taught in U.S. patent application Ser. No. 14/447,350 (which is incorporated by reference in its entirety). In the illustrated embodiment, there are pivot connections 136A, 136B respectively between wing panels 132A, 132B and central panels 126A, 126B and pivot connections 138A, 138B respectively between wing panels 134A, 134B and central panels 126A, 126B. Pivot connections are also present between the wing panels and central panels that are not shown.

Figure 10:
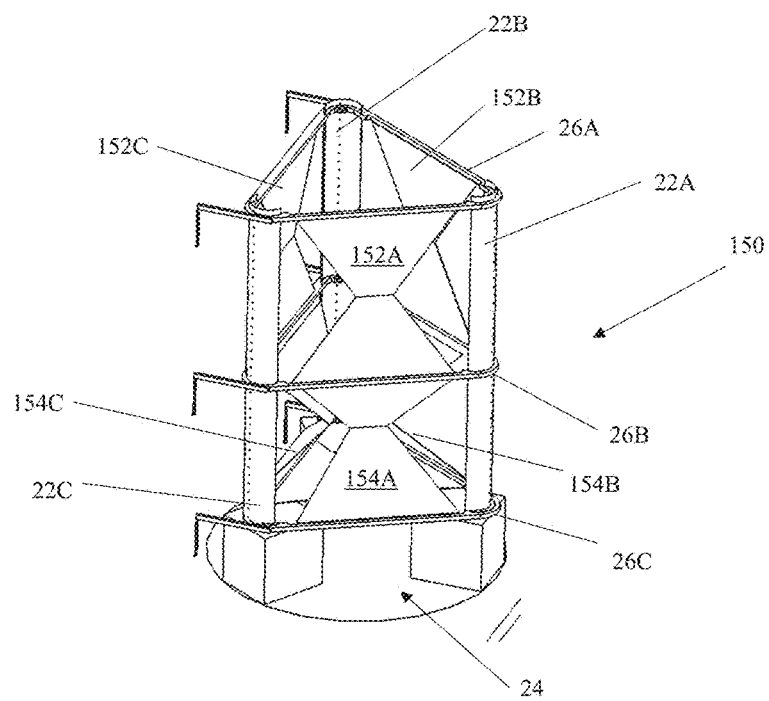
FIG. 10 illustrates the use of flex circuits to serve as diagonals and to provide a structure for conveying electrical signals to and/or from an electrical device associated with the boom.

With reference to FIG. 10, another embodiment of a deployable tape boom (hereinafter referred to as "boom 150") is discussed. The boom 150 is substantially identical to boom 20, except that boom 150 does not employ flexible filaments for the diagonals and, as such, avoids the use of cassettes to store and dispense such filaments. Elements in boom 150 that are substantially identical to those in boom 20 are given common reference numbers. The boom 150 includes a first set of the three flex circuit diagonals 152A-152C that each extend between the first batten 26A and the third batten 26C and a second set of three flex circuit diagonals 154A-154C that each extend between the second batten 26B and the third batten 26C. Each of the flex circuit diagonals 152A-152C and 154A-154C acts like a pair of crossing diagonals (i.e., serves the same function as one of the crossing pairs of filament diagonals in boom 20) and provides one or more paths for the transmission of electrical signals between the battens with which the flex circuit is associated. In the illustrated embodiment, each of the flex circuit diagonals 152A-152C and 154A-154C has an hour glass shape and has a crease that allows the flex circuit diagonal to be folded at its narrowest extent. The hour glass shape and crease allows each of the flex circuit diagonals 152A-152C and 154A-154C to be folded and occupy an independent pie slice like portion of the triangular interior space of a batten or pair of battens when the battens are in a stowed state. Further, the hour glass shape of each of the flex circuit diagonals embodies material that occupies the same space as is occupied by a pair of crossing filament diagonals. As such, each of the flex circuit diagonals 152A-152C and 154A-154C is capable of performing substantially the same function as a pair of crossing filament diagonals. While the boom 150 has replaced all of the filament, crossing diagonals of the boom 20 with flex circuits, it should be appreciated that a boom in which there is a combination of diagonals made up filament diagonals and flex circuit diagonals that provide the functionality of a pair of crossing filament diagonal is feasible. For example, a boom made have a single flex circuit diagonal with the remaining diagonals being filament diagonals. Such a single flex circuit diagonal could, for example, be used to transmit electrical signals between two instruments, one instrument associated with one batten and another instrument associated with the adjacent batten. Two or more flex circuit diagonals can be used to transmit electrical signals over two or more bays. For instance, flex circuit diagonals 152A, 154A may be embodied in a single flex circuit or operably connected to one another so as to be able to transmit an electrical signal between the first and second battens 26A, 26B. Also feasible is an electrical path provided by the flex circuit diagonals that does not extend linearly when the boom 150 is deployed. For instance, a flex circuit or other suitable conductor can be used to electrically connect the flex circuit diagonal 152B with the flex circuit 154A. Flex circuit diagonals with other shapes and two or more creases that facilitate accordion folding are also feasible.

The foregoing description of the invention is intended to explain the best mode known of practicing the invention and to enable others skilled in the art to utilize the invention in various embodiments and with the various modifications required by their particular applications or uses of the invention.

What is claimed is:

1. A deployable boom structure comprising:
    three tape longerons, each of the three tape longerons having a first terminal end, a second terminal end that is separated from the first terminal end, a first lateral edge that extends from the first terminal end to the second terminal end, a second lateral edge that extends from the first terminal end to the second terminal end and is separated from the first lateral edge, a first face that extends from the first lateral edge to the second lateral edge and from the first terminal end to the second terminal end, and a second face that is separated from the first face and extends from the first lateral edge to the second lateral edge and from the first terminal end to the second terminal end;
    three battens with each of the three battens operatively engaging the three tape longerons and defining a plane;
    a plurality of diagonals with each diagonal operatively connected to two of the three battens and capable of being folded when the plurality of diagonals are in an undeployed state;
    a drive mechanism for transitioning the three tape longerons the three battens, and the plurality of diagonals between an undeployed state and a deployed state in which:
    (a) a linearly extending portion of each of the three tape longerons extends linearly and substantially parallel to the linearly extending portion of each of the other three tape longerons, and separated from the linearly extending portion of each of the other three tape longerons such that the first and second lateral edges of the linearly extending portion do not directly contact the first or second edges of the linearly extending portion of either of the other two tape longerons;
    (b) each of the three battens extends substantially perpendicular to the linearly extending portions of the three tape longerons;
    (c) each of the three battens is separated from an immediately adjacent one of the three battens by a predetermined distance; and
    (d) each of the plurality of diagonals extends in a straight line between the two battens to which the diagonal is connected when the distance between the two battens is substantially equal to the predetermined distance, the straight line being at an acute angle to the plane of each of the two battens;
    wherein the three battens comprise a first batten, a second batten, and a third batten with the third batten located between the first and second battens and the third batten being a sliding batten that defines three apertures with each aperture capturing a different one of the three tape longerons such that each of the three tape longerons is constrained to moving linearly and perpendicularly relative to the sliding batten during the transitioning of the at least three tape longerons between the undeployed and deployed states;
    a detent mechanism for use in fixing the position of the sliding batten relative to the three tape longerons, the detent mechanism comprising a position-fixing perforation in one of the three tape longerons that is defined by a closed-loop wall which extends from the first face to the second face of the one of the three tape longerons and a spring-biased engagement surface operatively connected to the sliding batten and positioned so that the spring-biased engagement surface can engage the closed-loop wall to fix the position of the sliding batten relative to the one of the three tape longerons.

2. The deployable boom structure, as claimed in claim 1, wherein:
    the spring-biased engagement surface is biased so as to extend into a space encompassed by one of the apertures associated with the sliding batten.

3. The deployable boom structure, as claimed in claim 1, wherein:
    the one of the three tape longerons having the position-fixing perforation has multiple perforations with the position-fixing perforation being one of the multiple perforations; and
    the drive mechanism includes a sprocket wheel with multiple cogs adapted to engage the multiple perforations to move the linearly extending portion of the one of the three tape longerons.

4. The deployable boom structure, as claimed in claim 1, wherein:

at least one diagonal of the plurality of diagonals includes a filament.

5. The deployable boom structure, as claimed in claim 4, further comprising:
a cassette for storing the filament when the distance between the two of the three battens is less than the predetermined distance and dispensing the filament as the distance between the two of the three battens increases.

6. The deployable boom structure, as claimed in claim 1, wherein:
the drive mechanism includes three tape cassettes with each tape cassette adapted to store and dispense one of the three tape longerons, an electric motor with a drive shaft, and a transmission system for transmitting rotational force produced by the electric motor to the three tape cassettes;
wherein each of the tape cassettes is adapted to store a first portion of one of the three tape longerons in a full Archimedean spiral roll when the tape is in an undeployed state, the first portion of each of the three tape longerons in the full Archimedean spiral roll being bounded by a first plane that is tangent to the full Archimedean spiral roll and perpendicular to the linearly extending portion of the tape longeron when the tape longeron is in the deployed state and a second plane tangent to the full Archimedean spiral roll, parallel to the first plane, and separated from the first plane;
wherein each tape cassette is adapted to store a wheel that rotates about a drive axle and contacts a second portion of the tape longeron that is not disposed in the Archimedean spiral roll, the wheel and the drive axle both located between the first and second planes, and the drive axle located substantially parallel to the first and second planes;
wherein the electric motor and drive shaft being located between the first and second planes associated with one of the three tape cassettes, the drive shaft having an axis of rotation that is parallel to the first and second planes and perpendicular to the drive axle of the wheel of the one of the three tape cassettes;
wherein the transmission system for transmitting rotational force produced by the electric motor includes first and second transmission axles with a u-joint connected to each end of each of the first and second axles.

7. The deployable boom, as claimed in claim 6, wherein:
two of the three battens, in the undeployed state, are disposed in a laminate stack and the planes of the sliding batten and one of the first and second battens are parallel to first and second planes of each of the three tape cassettes.

8. The deployable boom structure, as claimed in claim 1, further comprising:
a flex circuit operatively connected to two of the three battens, the flex circuit having: (a) a flexible, plastic substrate capable of being folded when in an undeployed state and having an extent such that the flex circuit can function as one of the plurality of diagonals in the deployed state and (b) a conductive pattern associated with the flexible, plastic substrate for conducting an electrical signal between the two battens.

9. The deployable boom structure, as claimed in claim 1, further comprising:
a flex circuit operatively connected to two of the three battens, the flex circuit having: (a) a flexible, plastic substrate capable of being folded when in an undeployed state and having an extent such that the flex circuit can function as two diagonals of the plurality of diagonals that cross one another and are located between two tape longerons that are immediately adjacent to one another in the deployed state and (b) a conductive pattern associated with the flexible, plastic substrate for conducting an electrical signal between the two battens.

10. The deployable boom, as claimed in claim 1, further comprising:
an accordion solar blanket comprising at least first, second, third, and fourth solar panels with a hinge between each of the first and second solar panels, the second and third solar panels, and the third and fourth solar panels that allow the panels to be Z-folded into an undeployed state in which the first, second, third, and fourth solar panels form a laminate stack; and
connectors for attaching the first solar panel to the first batten, the second and third solar panels to the third batten, and the fourth solar panel to the second batten.

11. The deployable boom, as claimed in claim 10, wherein:
at least one of the at least first, second, third, and fourth solar panels comprises at least two solar sub-panels and a springed-hinge structure connecting the at least two solar sub-panels that allows the two solar sub-panels: (a) to form a laminate stack suitable for use in an undeployed state and (b) to be disposed in a substantially coplanar orientation for use in a deployed state.

12. A deployable boom structure comprising:
three tape longerons, each of the three tape longerons having a first terminal end, a second terminal end that is separated from the first terminal end, a first lateral edge that extends from the first terminal end to the second terminal end, and a second lateral edge that extends from the first terminal end to the second terminal end and is separated from the first lateral edge;
three battens with each of the three battens operatively engaging the three tape longerons and defining a plane;
a plurality of diagonals with each diagonal operatively connected to two of the three battens and capable of being folded when the plurality of diagonals are in the undeployed state;
a drive mechanism for transitioning the three tape longerons, the three battens, and the plurality of diagonals between an undeployed state and a deployed state in which:
(a) a linearly extending portion of each of the three tape longerons extends linearly and substantially parallel to the linearly extending portion of each of the other three tape longerons, and separated from the linearly extending portion of each of the other three tape longerons such that the first and second lateral edges of the linearly extending portion do not directly contact the first or second edges of the linearly extending portion of either of the other two tape longerons;
(b) each of the three battens extends substantially perpendicular to the linearly extending portions of the three tape longerons; and
(c) each of the three battens is separated from an immediately adjacent one of the three battens by a predetermined distance; and
(d) each of the plurality of diagonals extends in a straight line between the two battens to which the diagonal is connected when the distance between the two battens is substantially equal to the predetermined distance, the straight line being at an acute angle to the plane of each of the two battens;

wherein the drive mechanism includes three tape cassettes with each tape cassette adapted to store and dispense one of the three tape longerons, an electric motor with a drive shaft, and a transmission system for transmitting rotational force produced by the electric motor to the three tape cassettes;

wherein each of the tape cassettes is adapted to store a first portion of one of the three tape longerons in a full Archimedean spiral roll when the tape is in an undeployed state, the first portion of each of the three tape longerons in the full Archimedean spiral roll being bounded by a first plane that is tangent to the full Archimedean spiral roll and perpendicular to the linearly extending portion of the tape longeron when the tape longeron is in the deployed state and a second plane tangent to the full Archimedean spiral roll, parallel to the first plane, and separated from the first plane;

wherein each tape cassette is adapted to store a wheel that rotates about a drive axle and contacts a second portion of the tape longeron that is not disposed in the Archimedean spiral roll, the wheel and the drive axle both located between the first and second planes, and the drive axle located substantially parallel to the first and second planes;

wherein the electric motor and drive shaft being located between the first and second planes associated with one of the three tape cassettes, the drive shaft having an axis of rotation that is parallel to the first and second planes and perpendicular to the drive axle of the wheel of the one of the three tape cassettes;

wherein the transmission system for transmitting rotational force produced by the electric motor includes first and second transmission axles with a u-joint connected to each end of each of the first and second axles.

13. A deployable boom structure, as claimed in claim 12, wherein:

the three battens comprise a first batten, a second batten, and a third batten with the third batten located between the first and second battens and the third batten being a sliding batten that defines three apertures with each aperture capturing a different one of the three tape longerons such that each of the three tape longerons is constrained to moving linearly and perpendicularly relative to the sliding batten during the transitioning of the at least three tape longerons between the undeployed and deployed states.

14. The deployable boom structure, as claimed in claim 13, further comprising:

a detent mechanism for use in fixing the position of the sliding batten relative to the three tape longerons, the detent mechanism comprising a position-fixing perforation in one of the three tape longerons that is defined by a closed-loop wall which extends through the one of the three tape longerons and a spring-biased engagement surface operatively connected to the sliding batten and positioned so that the spring-biased engagement surface can engage the closed-loop wall when the closed-loop wall is located in a space encompassed by one of the apertures associated with the sliding batten to fix the position of the sliding batten relative to the one of the three tape longerons.

15. The deployable boom structure, as claimed in claim 14, further comprising:

the one of the three tape longerons having the position-fixing perforation has multiple perforations with the position-fixing perforation being one of the multiple perforations; and the wheel includes multiple cogs adapted to engage the multiple perforations to move the linearly extending portion of the one of the three tape longerons.

16. The deployable boom structure, as claimed in claim 12, further comprising:

operatively connected to two of the three battens, the flex circuit having: (a) a flexible, plastic substrate capable of being folded when in an undeployed state and having an extent such that the flex circuit can function as one of the plurality of diagonals in the deployed state and (b) a conductive pattern associated with the flexible, plastic substrate for conducting an electrical signal between the two battens.

17. A deployable boom, as claimed in claim 12, further comprising:

an accordion solar blanket comprising at least first, second, third, and fourth solar panels with a hinge between each of the first and second solar panels, the second and third solar panels, and the third and fourth solar panels that allow the panels to be Z-folded into an undeployed state in which the first, second, third, and fourth solar panels form a laminate stack; and connectors for attaching the first solar panel to the first batten, the second and third solar panels to the second batten, and the fourth solar panel to the third batten.

18. The deployable boom, as claimed in claim 12, wherein:

two of the three battens, in the undeployed stated, are disposed in a laminate stack and the planes of the sliding batten and one of the first and second battens are parallel to first and second planes of each of the three tape cassettes.

19. A deployable boom structure comprising:

three tape longerons, each of the three tape longerons having a first terminal end, a second terminal end that is separated from the first terminal end, a first lateral edge that extends from the first terminal end to the second terminal end, a second lateral edge that extends from the first terminal end to the second terminal end and is separated from the first lateral edge, a first face that extends from the first lateral to the second lateral edge and from the first terminal end to the second terminal end, and a second face that is separated from the first face and extends from the first lateral edge to the second lateral edge and from the first terminal end to the second terminal end;

three battens with each of the three battens operatively engaging the three tape longerons and defining a plane;

a plurality of diagonals with each diagonal operatively connected to two of the three battens and capable of being folded when the plurality of diagonals are in an undeployed state;

a drive mechanism for transitioning the three tape longerons, the three battens, and the plurality of diagonals between an undeployed state and a deployed state in which:

(a) a portion of each of the three tape longerons extends linearly and substantially parallel to the linearly extending portion of each of the other three tape longerons, and separated from the linearly extending portion of each of the other three tape longerons such that the first and second lateral edges of the linearly extending portion do not directly contact the first or second edges of the linearly extending portion of either of the other two tape longerons;

(b) each of the three battens extends substantially perpendicular to the linearly extending portions of the three tape longerons;

(c) each of the three battens is separated from an immediately adjacent one of the three battens by a predetermined distance; and (d) each of the plurality of diagonals extends in a straight line between the two battens to which the diagonal is connected when the distance between the two battens is substantially equal to the predetermined distance, the straight line being at an acute angle to the plane of each of the two battens;

a flex circuit operatively connected to two of the three battens, the flex circuit having: (a) a flexible, plastic substrate capable of being folded when in an undeployed state and having an extent such that the flex circuit can function as one of the plurality of diagonals in the deployed state and (b) a conductive pattern associated with the flexible, plastic substrate for conducting an electrical signal between the two battens.

20. A deployable boom structure, as claimed in claim 19, wherein:

the flex circuit has an extent such that the flex circuit can function as two diagonals of the plurality of diagonals that cross one another and are located between two tape longerons that are immediately adjacent to one another in the deployed state.

21. The deployable boom structure, as claimed in claim 19, further comprising:

wherein the three battens comprise a first batten, a second batten, and a third batten with the third batten located between the first and second battens and the third batten being a sliding batten that defines three apertures with each aperture capturing a different one of the three tape longerons such that each of the three tape longerons is constrained to moving linearly and perpendicularly relative to the sliding batten during the transitioning of the at least three tape longerons between the undeployed and deployed states;

a detent mechanism for use in fixing the position of the sliding batten relative to the three tape longerons, the detent mechanism comprising a position-fixing perforation in one of the three tape longerons that is defined by a closed-loop wall which extends through the one of the three tape longerons and a spring-biased engagement surface operatively connected to the sliding batten and positioned so that the spring-biased engagement surface can engage the closed-loop wall when the closed-loop wall is located in a space encompassed by one of the apertures associated with the sliding batten to fix the position of the sliding batten relative to the one of the three tape longerons.

22. A deployable boom structure, as claimed in claim 19, wherein:

the drive mechanism includes three tape cassettes with each tape cassette adapted to store and dispense one of the three tape longerons, an electric motor with a drive shaft, and a transmission system for transmitting rotational force produced by the electric motor to the three tape cassettes;

wherein each of the tape cassettes is adapted to store a first portion of one of the three tape longerons in a full Archimedean spiral roll when the tape is in an undeployed state, the first portion of each of the three tape longerons in the full Archimedean spiral roll being bounded by a first plane that is tangent to the full Archimedean spiral roll and perpendicular to the linearly extending portion of the tape longeron when the tape longeron is in the deployed state and a second plane tangent to the full Archimedean spiral roll, parallel to the first plane, and separated from the first plane;

wherein each tape cassette is adapted to store a wheel that rotates about a drive axle and contacts a second portion of the tape longeron that is not disposed in the Archimedean spiral roll, the wheel and the drive axle both located between the first and second planes, and the drive axle located substantially parallel to the first and second planes;

wherein the electric motor and drive shaft being located between the first and second planes associated with one of the three tape cassettes, the drive shaft having an axis of rotation that is parallel to the first and second planes and perpendicular to the drive axle of the wheel of the one of the three tape cassettes;

wherein the transmission system for transmitting rotational force produced by the electric motor includes first and second transmission axles with a u-joint connected to each end of each of the first and second axles.

* * * * *